United States Patent
An

(10) Patent No.: US 7,110,868 B2
(45) Date of Patent: Sep. 19, 2006

(54) METHOD FOR DETERMINING STATE OF ENGINE SPEED SENSOR FOR VEHICLE

(75) Inventor: Ji Hoon An, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/246,490

(22) Filed: Oct. 7, 2005

(65) Prior Publication Data

US 2006/0075808 A1    Apr. 13, 2006

(30) Foreign Application Priority Data

Oct. 7, 2004    (KR) .................. 10-2004-0080056

(51) Int. Cl.
*G06F 19/00* (2006.01)
*G06F 1/00* (2006.01)

(52) U.S. Cl. .................. 701/29; 701/101; 123/319

(58) Field of Classification Search .................. 701/29, 701/34, 36, 101, 102, 116; 123/319; 73/339.1, 73/35.01; 324/378
See application file for complete search history.

(56) References Cited

U.S. PATENT DOCUMENTS 4,255,789 A * 3/1981 Hartford et al. ............ 701/108
4,570,594 A * 2/1986 Egami et al. ........... 123/406.25
5,678,521 A * 10/1997 Thompson et al. ......... 123/447

* cited by examiner

*Primary Examiner*—John T. Kwon
(74) *Attorney, Agent, or Firm*—Morgan Lewis & Bockius LLP

(57) ABSTRACT

Disclosed is a method for determining the state of an engine speed sensor for a vehicle which can improve stability of the engine during the slow speed rotation of the engine through prompt entry into failure mode by changing a condition of the failure determination according to the state of the engine and thereby minimizing the failure determining time of the engine.

3 Claims, 2 Drawing Sheets

METHOD FOR DETERMINING STATE OF ENGINE SPEED SENSOR FOR VEHICLE

CROSS-REFERENCE TO RELATED APPLICATION

This application claims priority to and the benefit of Korean Patent Application 10-2004-0080056 filed in the Korean Intellectual Property Office on Oct. 7, 2004, the entire content of which is incorporated by reference herein.

FIELD OF THE INVENTION

The present invention relates to a method for determining the state of an engine speed sensor for a vehicle, and more particularly to such a method in which stability of the engine during the slow speed rotation of the engine can be improved through prompt entry into a failure mode.

DESCRIPTION OF RELATED ART

Generally, an engine for converting linear movement force generated by combustion of fuel to rotational movement force is installed in a vehicle, and an engine speed senor for measuring the engine speed is installed in the engine to facilitate stable operation of the engine. Since the engine speed sensor operates in a harsh temperature and vibration environment, the sensor and connector are apt to undergo electrical contact inferiorities (short-circuiting, instant short-circuiting, increase of contact resistance).

On the other hand, since the proper determination of the engine speed in an engine control system is an important factor for determining the injection and ignition time, prompt and suitable failure determination and failure mode operation are necessary for securing engine stability during failure of the engine speed detecting sensor.

As shown in FIG. 1, if a failure signal is not generated in the engine speed sensor, the sensor is determined to be normal, and if a failure signal is generated in the engine speed sensor, a signal of a camshaft which is generated in a cam shaft position sensor is confirmed.

Then, whether the sensor is in a state of failure or not is determined according to the generation time of the signal in the camshaft position sensor. If the failure signal disappears in a time interval for which the camshaft is operated in more than two revolutions (about 0.35 seconds in idle state), the sensor is determined to be normal, and, if the failure signal exists continuously during a time interval for which the camshaft is operated in more than two revolutions, the sensor is determined to be in a failure state.

However, according to the conventional method, since the sensor is determined to be in a failure state when the signal of the camshaft position sensor is input during the time interval for which the camshaft is operated in more than two revolutions (about 0.35 seconds in idle state) but the signal of the engine speed sensor is not input, the engine can be stopped before the determination of failure at a slow speed such as in an idle state or the like.

More particularly, since the conventional method determines the sensor to be in a failure state when the signal from the engine speed sensor is not detected and the signal of the camshaft position sensor during the time interval for which the camshaft is operated for more than two revolutions is detected to prevent an incorrect failure determination of the engine speed sensor in the case of a normal engine stop, an engine stop due to other reasons, an engine start, an introduction of signal noise of the camshaft position sensor, the stability of the engine cannot be secured in the case of low speed.

SUMMARY OF THE INVENTION

Embodiments of the present invention provide methods for determining the state of an engine speed sensor for a vehicle which can realize stability of the engine during the slow speed rotation of the engine through prompt entry into failure mode by changing conditions of the failure determination according to the state of the engine and thereby minimizing the failure determination time of the engine.

A method for determining the state of an engine speed sensor for a vehicle, according to an exemplary embodiment of the invention includes determining the engine speed sensor as being in a normal state when a signal is generated in the engine speed sensor and checking a start switch when a signal is not generated in the engine speed sensor; determining the engine speed sensor as being in the normal state when the start switch is off and judging whether a signal of a camshaft position sensor indicates more than two revolutions when the start switch is in the start state; determining the engine speed sensor as being in a normal state when the signal of the camshaft position sensor indicates more than two revolutions and determining the engine speed sensor as being in a failure state when the signal of the camshaft position sensor indicates less than two revolutions; determining the engine speed sensor as being be in a normal state when the start switch is on and the signal of the camshaft position sensor indicates less than one revolution, and determining the engine speed sensor as being in a state of temporary failure and switching into a failure mode when the start switch is on and the signal of the camshaft position sensor indicates more than two revolutions; and determining the engine speed sensor as being in a normal state when the signal from the camshaft position sensor is stopped and determining the engine speed sensor as being in a state of permanent failure when the signal is continuously generated in the camshaft position sensor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
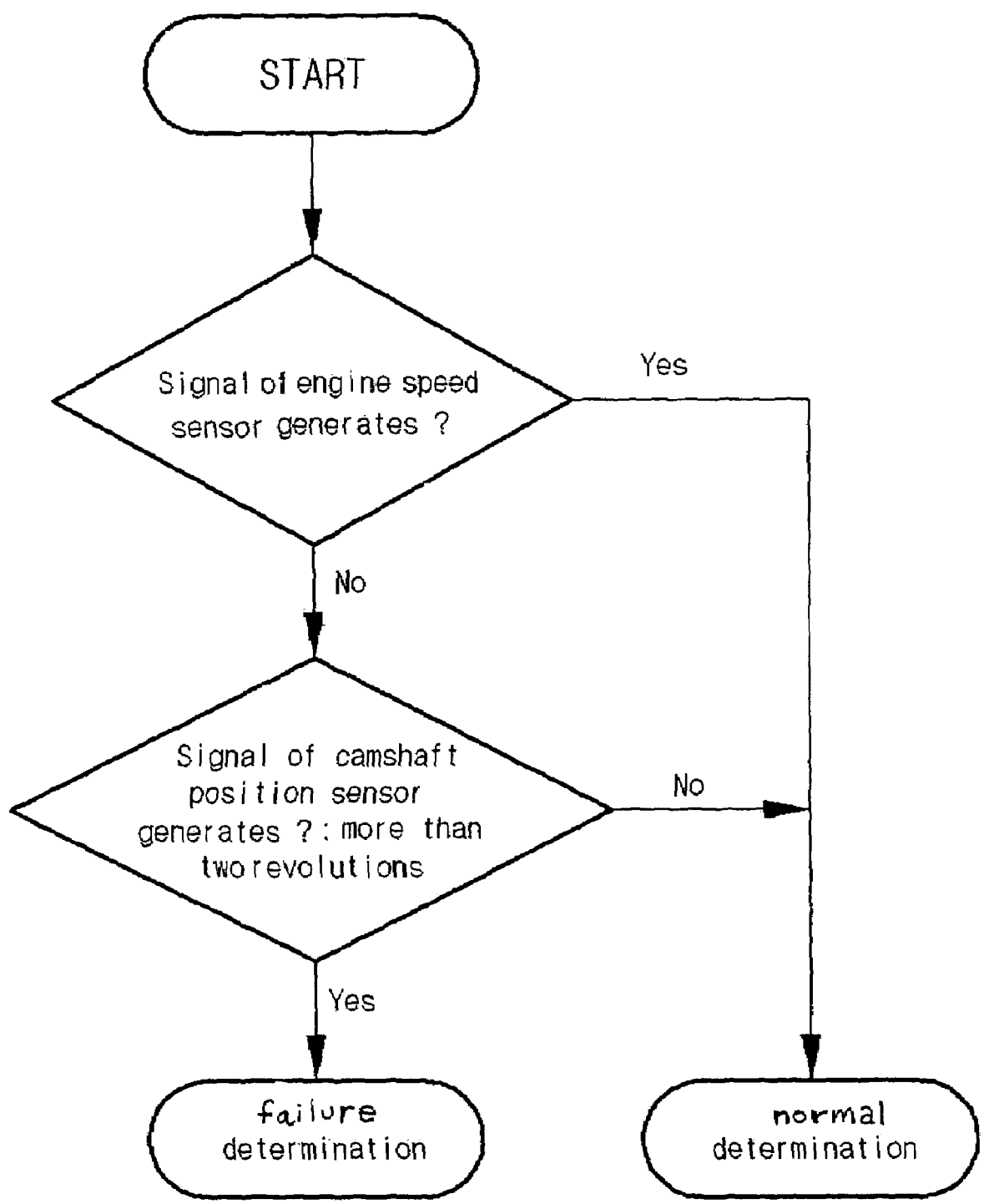
FIG. 1 is a flow chart for explaining a conventional engine failure determining method.
Figure 2:
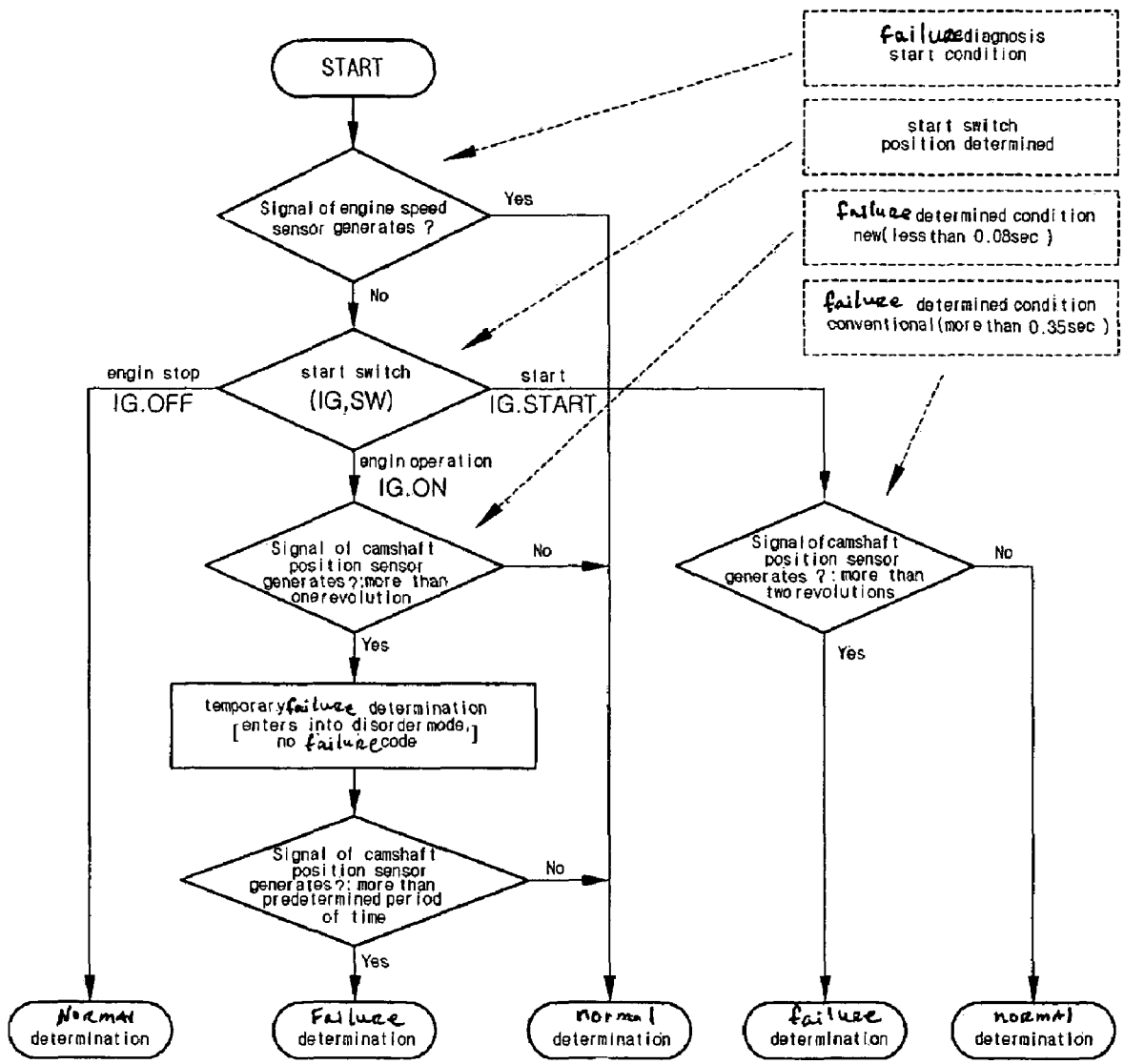
FIG. 2 is a flow chart for explaining an engine failure determining method according to an exemplary embodiment of the present invention.

Referring to FIG. 2, according to an exemplary embodiment of the present invention, if a signal is generated in an engine speed sensor, the engine speed sensor is determined to be in a normal state, and if a signal is not generated in the engine speed sensor and a start switch is converted to an off state by a driver to normally stop the engine, a logic for failure diagnosis is not performed. Namely, the engine speed sensor is determined to be in a normal state.

On the other hand, in the case of an abnormal engine stop during the operation of the engine, namely if the engine is stopped when the start switch is in an on state, the failure diagnosis logic is performed, and then if a signal is not generated in the engine speed sensor and at least one signal is generated in a camshaft position sensor, the engine speed sensor can be in a failure state due to other problems and is determined to be in a state of temporary failure and enters into a failure mode state.

In this state, if a failure diagnosis condition continues for a predetermined period of time (e.g., noise filtering), the state of temporary failure is converted to a state of permanent failure and a failure code is provided to the driver.

On the other hand, in the initial start, as in the conventional art, the engine speed sensor is determined to be in a state of failure in the case in which a signal is not generated in the engine speed sensor and a signal for indicating two revolutions of the camshaft is generated in the camshaft position sensor, to supplement the fact that the response of the engine speed sensor is slower than that of the camshaft position sensor.

As mentioned above, according to the present invention, when a failure signal is generated in the engine speed sensor for measuring the rotational speed of the engine, since the failure of the engine is promptly diagnosed by changing the condition of the failure diagnosis corresponding to the driving state of the engine, the engine stability for preventing the start switch from being stopped during idling and low speed rotation due to the delay of the failure diagnosis time.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for determining a state of an engine speed sensor for a vehicle, the method comprising:

determining the engine speed sensor as being in a normal state when a signal is generated in the engine speed sensor and checking a start switch when a signal is not generated in the engine speed sensor;

determining the engine speed sensor as being in the normal state when the start switch is off and judging whether a signal of a camshaft position sensor indicates more than two revolutions when the start switch is in the start state;

determining the engine speed sensor as being in a normal state when the signal of the camshaft position sensor indicates more than two revolutions and determining the engine speed sensor as being in a state of failure when the signal of the camshaft position sensor indicates less than two revolutions;

determining the engine speed sensor as being be in a normal state when the start switch is on and the signal of the camshaft position sensor indicates less than one revolution, and determining the engine speed sensor as being in a state of temporary failure and switching into a failure mode when the start switch is on and the signal of the camshaft position sensor indicates more than two revolutions; and determining the engine speed sensor as being in a normal state when the signal from the camshaft position sensor is stopped and determining the engine speed sensor as being in a state of permanent failure when the signal is continuously generated in the camshaft position sensor.

2. A method according to claim 1, wherein, when the start switch is on, a period for one revolution of the camshaft position sensor is 0.08 seconds.

3. A method according to claim 1, wherein, when the start switch is in the start state, a period for two revolutions of the camshaft position sensor is 0.35 seconds.

* * * * *